UNITED STATES PATENT OFFICE.

JAMES HOGBEN, OF CLEVELAND, OHIO.

IMPROVEMENT IN COMPOUNDS FOR SIZING PAPER.

Specification forming part of Letters Patent No. 164,684, dated June 22, 1875; application filed April 14, 1875.

*To all whom it may concern:*

Be it known that I, JAMES HOGBEN, of Cleveland, in the county of Cuyahoga and State of Ohio, have invented a certain new and Improved Sizing for Paper, of which the following is a complete description:

The nature of this invention relates to a compound for sizing paper, and the object of the same is to render the paper more or less impervious to ink, so that the ink will lie up clear and distinct, and not be absorbed into the tissue of the paper; also, for making the paper stronger, and of smooth and fine surface finish, at the same time improving the color of the paper, and for acting as a mordant for fixing the colors of the above-said compound. The following is an example of the material and proportion of the same, and the manner of compounding them, not confining myself, however, to the exact proportion expressed in the following formula:

Soda-ash, carbonate of soda, or their equivalents, three hundred pounds; twelve hundred pounds rosin; chloride of sodium, (common salt,) five pounds; raw linseed-oil, two gallons, or its equivalent vegetable oil; silicate of soda, thirty-six gallons, gravity 28° Baumé.

The process of compounding these ingredients is as follows, or substantially so: I take the three hundred pounds of soda-ash, and dissolve it in about eighty-five gallons of boiling water, and allow the solution to settle. The solution is then siphoned off into any suitable vessel, the precipitate remaining in the bottom of the vessel in which the solution was effected. This precipitate is utilized for destroying the fatty or animal matter in boiling rags. The twelve hundred pounds of rosin is reduced to a powder, which is then added slowly to the soda-ash solution, after said solution is raised to a boiling-point, which must be constantly stirred while it is being added, and continued to be boiled for about one hour. Then is added the chloride of sodium, (common salt.) This mixture is continued to be boiled until a chemical union is formed of the said alkaline solution, rosin, and common salt.

While in this heated state I next combine therewith the two gallons of linseed or other equivalent vegetable oil, thoroughly incorporating it therewith. I now add the silicate of soda slowly to the mixture, constantly stirring the same while being added, continuing the boiling for about thirty minutes after all the ingredients are mixed together. It is then drawn off into suitable vessels for use.

The practicable application of this sizing for the purpose specified is as follows: Of this sizing compound I take from one to three quarts, and dissolve it in about a pailful of boiling water, and add it to the pulp that will make about one hundred pounds of paper. To this compound and pulp, when thoroughly mixed in the beating-engine, I add from three to four pounds of alum dissolved in water. The pulp thus treated and having attained the proper consistency is now run off into receivers, from which it is taken onto the machine when the paper is formed.

Of the several advantages of this sizing compound over others in use we instance the following:

It is less expensive. It causes but little foam while being used; hence no trouble and injury to the paper results therefrom. It does not cause the paper to stick to the press-rolls, which is a source of much trouble in using other sizings. It makes the paper harder and susceptible of a higher finish. It improves the color of white paper, and acts as a mordant to fix the color of colored paper.

What I claim as my invention, and desire to secure by Letters Patent, is—

The herein-described compound for sizing paper, consisting of the ingredients specified, viz., soda-ash, carbonate of soda, rosin, chloride of sodium, linseed-oil, and silicate of soda, or their equivalents, in about the proportions set forth, and compounded in the manner substantially as described, and for the purpose specified.

JAMES HOGBEN.

Witnesses:
J. H. BURRIDGE,
A. F. CORNELL.